US012397457B2

(12) United States Patent
Zhong

(10) Patent No.: US 12,397,457 B2
(45) Date of Patent: Aug. 26, 2025

(54) ELECTRIC CLIPPER HAVING INTEGRATED HAIR CUTTING AND SUCTION

(71) Applicant: Yishun Zhong, Guangdong (CN)

(72) Inventor: Yishun Zhong, Guangdong (CN)

(73) Assignee: Shenzhen Arete Dynamis Technology Co., Ltd., Shenzhen (CN)

( * ) Notice: Subject to any disclaimer, the term of this patent is extended or adjusted under 35 U.S.C. 154(b) by 251 days.

(21) Appl. No.: 18/204,976

(22) Filed: Jun. 2, 2023

(65) Prior Publication Data

US 2023/0302671 A1 Sep. 28, 2023

(30) Foreign Application Priority Data

Mar. 23, 2023 (CN) ......................... 202320581452.8

(51) Int. Cl.
*B26B 19/02* (2006.01)
*B26B 19/44* (2006.01)

(52) U.S. Cl.
CPC .............. *B26B 19/02* (2013.01); *B26B 19/44* (2013.01)

(58) Field of Classification Search
CPC ................................ B26B 19/02; B26B 19/44
See application file for complete search history.

(56) References Cited

U.S. PATENT DOCUMENTS 2,292,453 A * 8/1942 Frank ...................... B26B 13/00 30/131
2,807,086 A * 9/1957 Watkins .................. B26B 19/34 30/41.5
2,914,849 A * 12/1959 Willie ...................... B26B 19/34 30/41.5
3,262,199 A * 7/1966 Magarian ................ B26B 19/44 30/41.5
3,368,277 A * 2/1968 021968 .................... B26B 19/34 30/41.5
4,628,601 A * 12/1986 Van Slooten ........... B26B 19/44 30/201
4,868,984 A * 9/1989 Elsherbini ............... B26B 19/44 30/41.5
7,975,385 B2 * 7/2011 Obermann .............. B26B 19/44 30/30
10,703,000 B2 * 7/2020 Li ........................ B26B 19/3846
2004/0083613 A1 * 5/2004 Andis ...................... B26B 19/02 30/34.05
2006/0174487 A1 * 8/2006 Andis ................... B26B 19/382 30/34.05
2006/0230619 A1 * 10/2006 Williams ................ B26B 19/44 30/133
2015/0224656 A1 * 8/2015 Johnson .................. B26B 19/44 30/133
2016/0361826 A1 * 12/2016 Musallam ............... B26B 19/06

(Continued)

*Primary Examiner* — Omar Flores Sanchez

(57) ABSTRACT

An electric clipper includes a face cover, an intermediate cover, a bottom cover and an electric cutting assembly. The face cover and the bottom cover are buckled on two sides of the intermediate cover respectively. A first accommodating space is formed between the intermediate cover and the bottom cover. The electric cutting assembly is fixedly arranged in the first accommodating space. A suction channel is formed between the face cover and the intermediate cover. The air inlet end of the suction channel is matched with the electric cutting assembly. An integration of hair cutting and suction is implemented.

3 Claims, 6 Drawing Sheets

(56) References Cited

U.S. PATENT DOCUMENTS

| | | | | |
|---|---|---|---|---|
| 2017/0182671 | A1* | 6/2017 | Fu | B26B 19/3886 |
| 2020/0139564 | A1* | 5/2020 | Li | B26B 19/3846 |
| 2021/0114242 | A1* | 4/2021 | Tellez | B26B 19/3853 |
| 2024/0033958 | A1* | 2/2024 | Wu | B26B 19/24 |
| 2024/0051163 | A1* | 2/2024 | Li | B26B 19/44 |
| 2024/0286302 | A1* | 8/2024 | Zeng | B26B 19/06 |
| 2024/0359346 | A1* | 10/2024 | Endo | B26B 19/42 |

* cited by examiner

ELECTRIC CLIPPER HAVING INTEGRATED HAIR CUTTING AND SUCTION

BACKGROUND OF THE INVENTION

1. Field of the Invention

The invention relates to hairdressing devices and more particularly to an electric clipper having integrated hair cutting and suction.

2. Description of Related Art

When people use traditional electric clippers for hairdressing, they usually tie a piece of cloth around their bodies and collect clipped hairs through external suction devices, preventing clipped hairs from falling onto their bodies to a certain extent; however, despite of wrapping a piece of cloth, when males with short hair get their hair cut, clipped hair may still fall into their coats from the collars, leading to itching on their bodies. When people use electric clippers to shear animals such as cats, dogs and sheep, they have to lay a piece of cloth on the ground and put the animals on the cloth for shearing, and then collect the clipped furs falling on the ground through external suction devices; however, the furs are still easy to fly everywhere in the falling process, making it difficult to collect them. In this context, the applicant devotes to developing a hair cutting and suction integrated electric clipper which is more favorable for collecting clipped hair or furs through the external suction devices.

SUMMARY OF THE INVENTION

The invention aims to realize more efficient collection of clipped hair or furs through external suction devices.

In order to achieve the above objective, the invention adopts the technical solution as follows:

A hair cutting and suction integrated electric clipper includes a face cover, an intermediate cover, a bottom cover and an electric cutting assembly, wherein the face cover and the bottom cover are buckled on two sides of the intermediate cover respectively, a first accommodating space is formed between the intermediate cover and the bottom cover, the electric cutting assembly is fixedly arranged in the first accommodating space, a suction channel is formed between the face cover and the intermediate cover, and the air inlet end of the suction channel is matched with the electric cutting assembly.

Further, the hair cutting and suction integrated electric clipper includes an external suction connector, wherein two ends of the external suction connector penetrate through the external suction connector, and one end of the external suction connector is buckled at the air outlet end of the suction channel.

Further, the hair cutting and suction integrated electric clipper includes an air blower and a baffle plate, an air inlet is formed in the center of the intermediate cover, an air outlet is formed in the bottom cover; the air blower is fixedly arranged in the first accommodating space, the air inlet end of the air blower communicates with the air inlet, the air outlet end of the air blower communicates with the air outlet, the baffle plate is fixedly arranged between the face cover and the intermediate cover, a second accommodating space is formed among the face cover, the intermediate cover and the baffle plate, and the air inlet communicates with the interior of the second accommodating space.

Further, a filter screen is fixedly arranged at the air inlet.

Further, the electric cutting assembly includes a power supply, a circuit control board, a motor and a cutter head assembly, the power supply, the motor and the air blower are electrically connected with the circuit control board, the motor drives the cutter head assembly to work, and the cutter head assembly is located at the air inlet end of the suction channel.

Further, the electric cutting assembly includes a slide switch and a touch switch, and both the slide switch and the touch switch are electrically connected with the circuit control board.

The invention has the following advantages and benefits in comparison with the conventional art: before the hair cutting and suction integrated electric clipper is used, the air inlet end of the external suction device is directly clamped at the air outlet end of the suction channel, so that the air inlet end of the external suction device communicates with the interior of the suction channel; when the external suction device works, air in the suction channel is extracted outside, so a negative pressure is formed in the suction channel; and after human hair or animal furs are cut by the electric cutting assembly, the clipped hair or furs are directly sucked in the suction channel and then sucked out by the external suction device, thereby preventing hair or furs from flying everywhere in the falling process. The hair cutting and suction integrated electric clipper is more favorable for collecting clipped hair or furs through the external suction devices.

The above and other objects, features and advantages of the invention will become apparent from the following detailed description taken with the accompanying drawings.

DETAILED DESCRIPTION OF THE INVENTION

Figure 1:
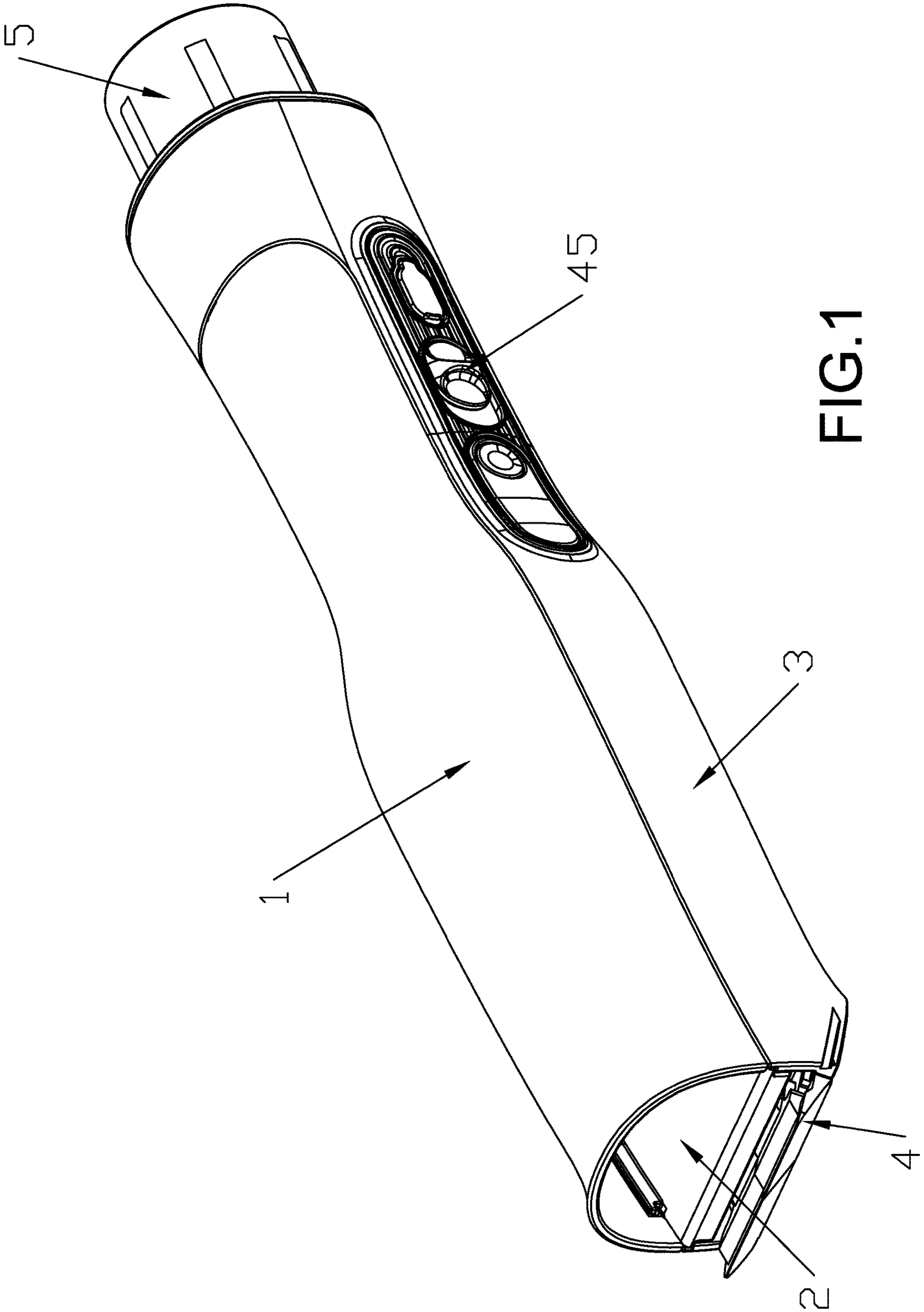
FIG. 1 is a perspective view of an electric clipper according to a first preferred embodiment of the invention.
Figure 2:
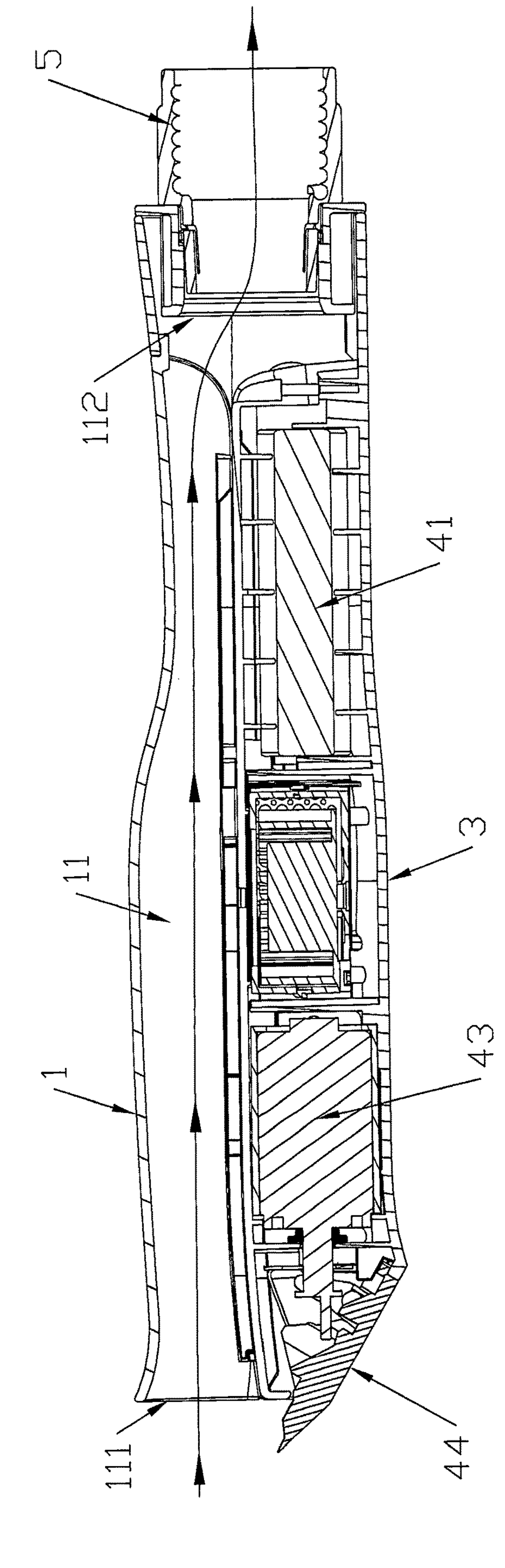
FIG. 2 is a longitudinal sectional view of the electric clipper in FIG. 1.
Figure 3:
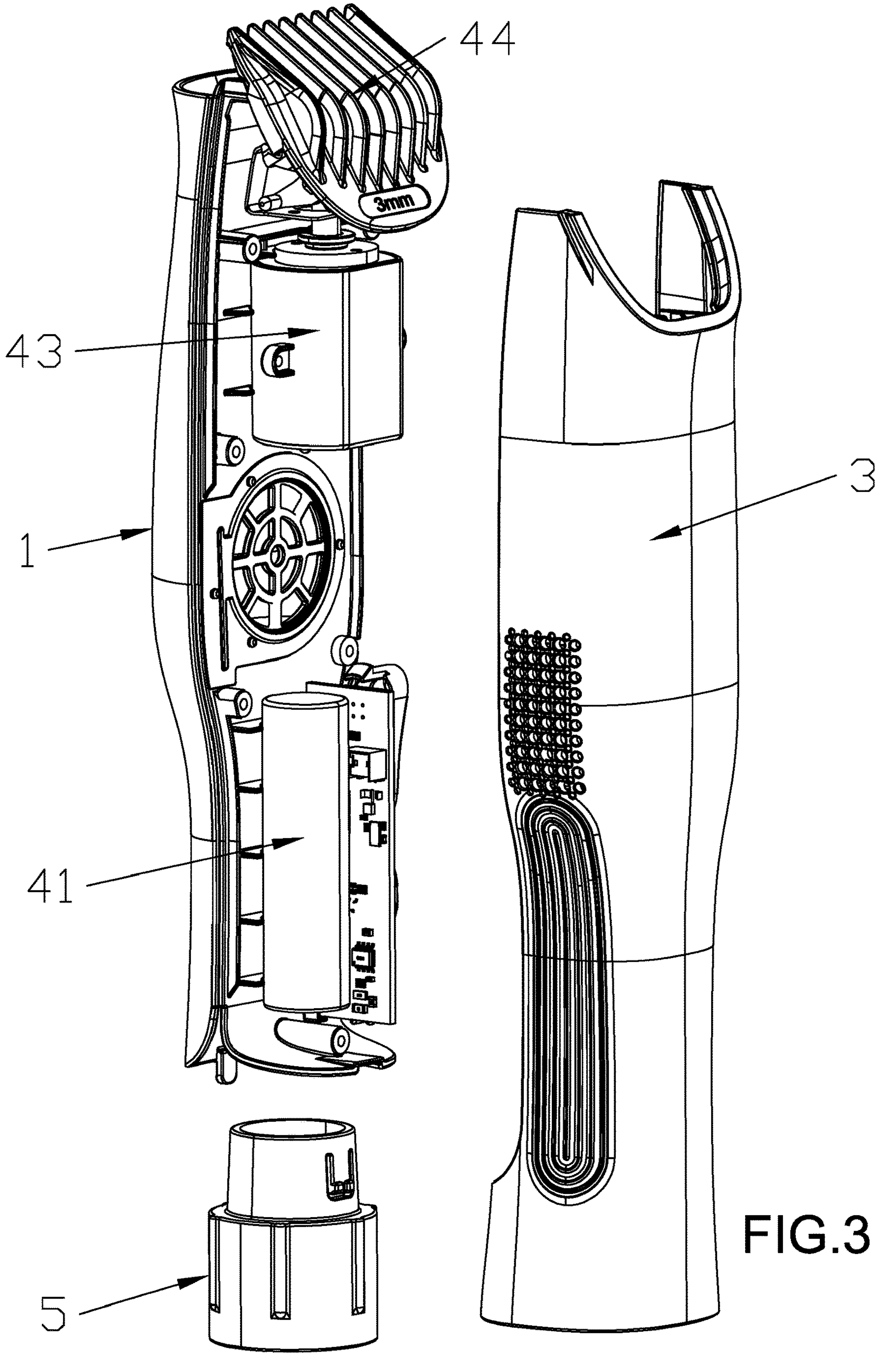
FIG. 3 is an exploded view of the electric clipper in FIG. 1.

Referring to FIGS. 1 to 3, an electric clipper in accordance with a first preferred embodiment of the invention comprises a face cover 1, an intermediate cover 2, a bottom cover 3, an electric cutting assembly 4, and an external suction connector 5 as discussed in detail below.

The face cover 1 and the bottom cover 3 are buckled on two sides of the intermediate cover 2 respectively, a first accommodating space is formed between the intermediate cover 2 and the bottom cover 3, the electric cutting assembly 4 is fixedly arranged in the first accommodating space, a suction channel 11 is formed between the face cover 1 and the intermediate cover 2, and the an air inlet end 111 of the suction channel 11 is matched with the electric cutting assembly 4.

As shown in FIG. 1 specifically, the left end of the suction channel 11 is the air inlet end 111 of the suction channel 11, the right end of the suction channel 11 is an air outlet end 112 of the suction channel 11, and the electric cutting assembly 4 is arranged at the position close to the air inlet end 111 of the suction channel 11.

Two ends of the external suction connector penetrate through the external suction connector 5, i.e. the left end and the right end of the external suction connector 5 are penetrated, and one end of the external suction connector 5 is buckled at the air outlet end 112 of the suction channel 11, so as to communicate with the interior of the air suction channel 11.

The electric cutting assembly 4 includes a power supply 41, a circuit control board 42, a motor 43, a cutter head assembly 44 and a slide switch 45, the power supply 41, the motor 43, the air blower 46 and the slide switch 45 are electrically connected with the circuit control board 42, the motor 43 drives the cutter head assembly 44 to work, and the cutter head assembly 44 is located at the air inlet end 111 of the suction channel 11.

When the slide switch 45 is operated, the slide switch 45 sends a signal to the circuit control board 42, and the circuit control board 42 controls the motor 43 to work.

Working principle: the air inlet end of the external suction device is connected with the external suction connector 5, so that the air inlet end of the external suction device communicates with the interior of the suction channel 11; when the external suction device works, air in the suction channel 11 is extracted outside, so a negative pressure is formed in the suction channel 11; when the slide switch 45 is operated, the slide switch 45 sends a signal to the circuit control board 42, the circuit control board 42 controls the motor 43 to work, the motor 43 drives the cutter head assembly 44 to work; and after human hair or animal furs are cut, and the clipped hair or furs are directly sucked in the suction channel 11 and then sucked out by the external suction device.

Figure 4:
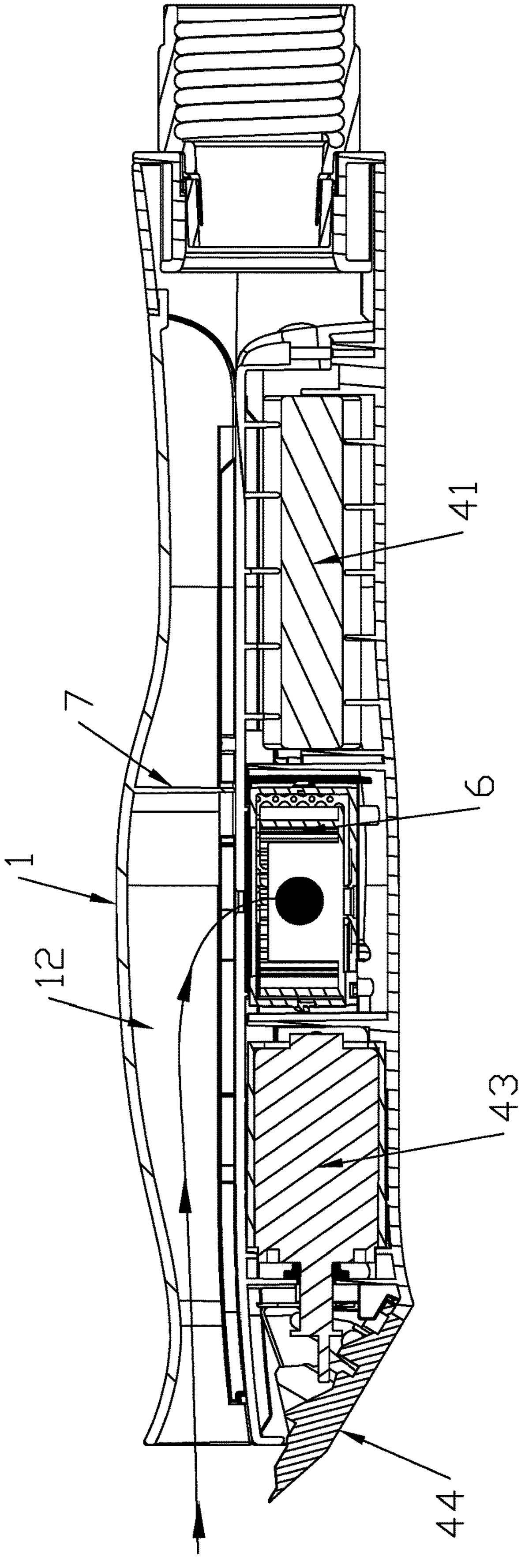
FIG. 4 is a longitudinal sectional view of an electric clipper according to a second preferred embodiment of the invention.
Figure 5:
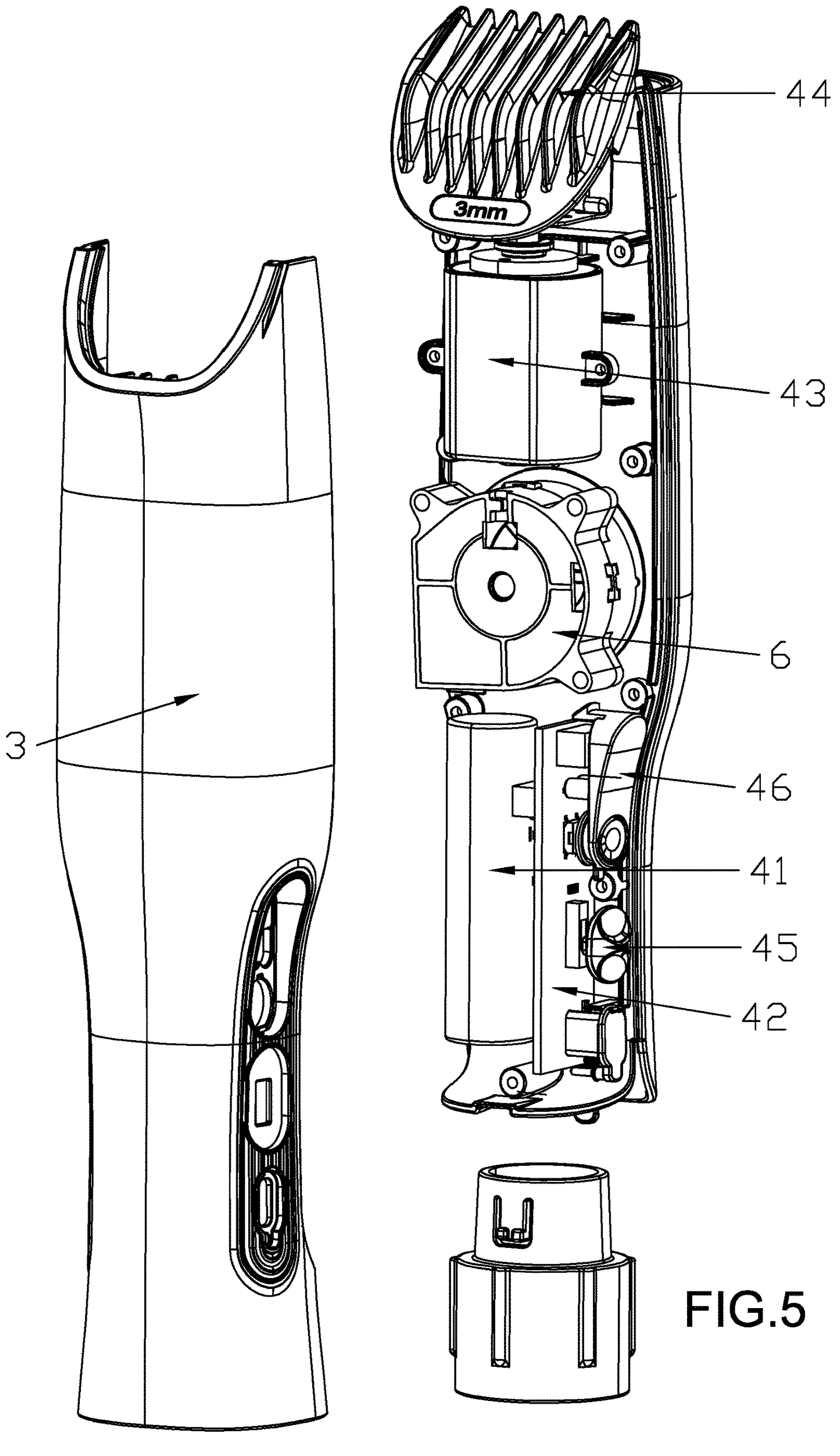
FIG. 5 is an exploded view of the electric clipper in FIG. 4.
Figure 6:
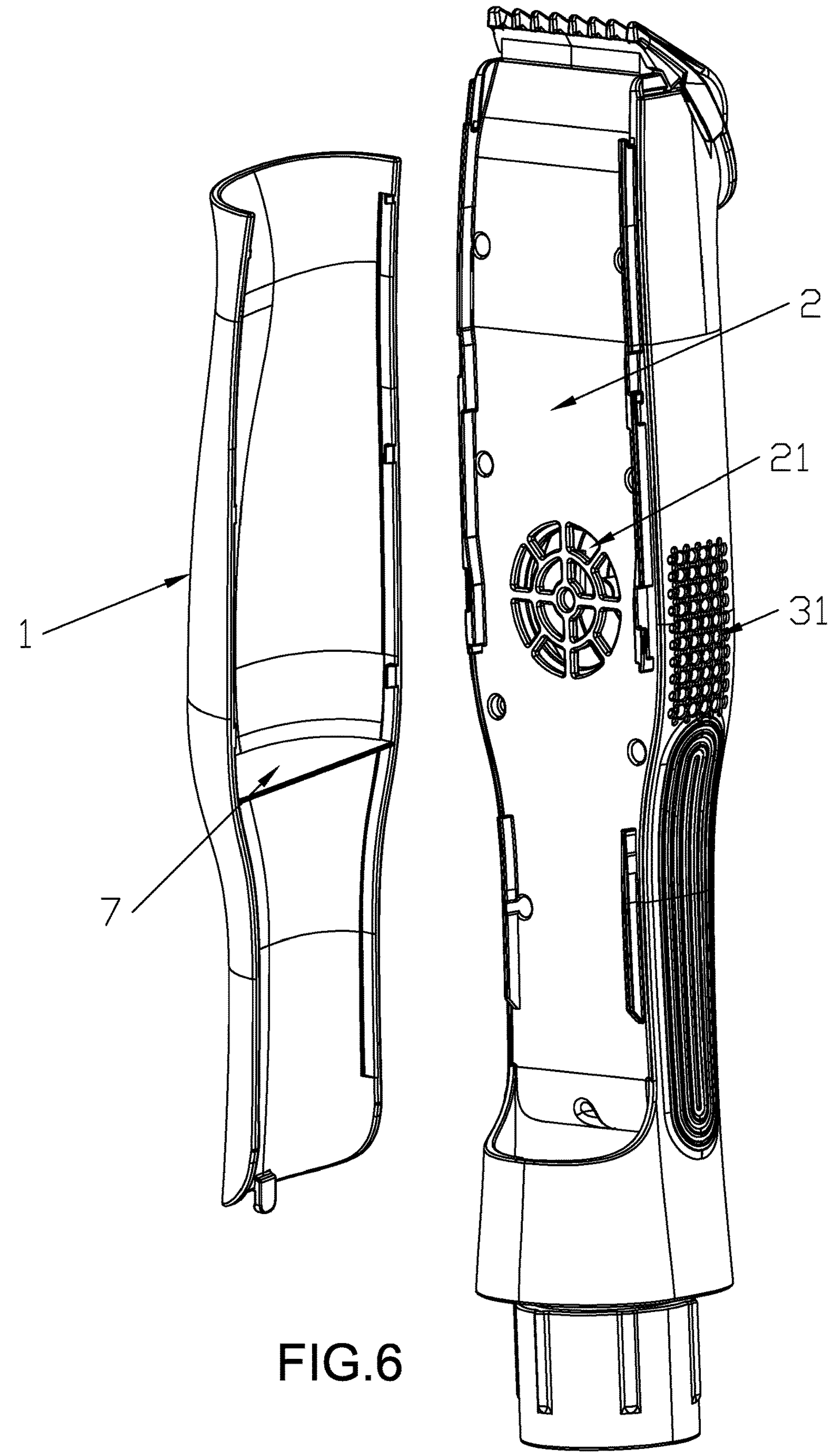
FIG. 6 is an exploded, perspective view of the electric clipper in FIG. 4.

Referring to FIGS. 4 to 6, an electric clipper in accordance with a second preferred embodiment of the invention is shown. The characteristics of the second preferred embodiment are substantially the same as that of the first preferred embodiment except the following:

The electric clipper comprises a face cover 1, an intermediate cover 2, a bottom cover 3, an electric cutting assembly 4, an air blower 6, and a baffle plate 7.

The face cover 1 and the bottom cover 3 are buckled on two sides of the intermediate cover 2 respectively, a first accommodating space is formed between the intermediate cover 2 and the bottom cover 3, the electric cutting assembly 4 is fixedly arranged in the first accommodating space, a suction channel 11 is formed between the face cover 1 and the intermediate cover 2, and the air inlet end of the suction channel 11 is matched with the electric cutting assembly 4.

As shown in FIG. 4 specifically, the left end of the suction channel 11 is an air inlet end 111 of the suction channel 11, the right end of the suction channel 11 is an air outlet end 112 of the suction channel 11, and the electric cutting assembly 4 is arranged at the position close to the air inlet end 111 of the suction channel 11.

An air inlet 21 is formed in the center of the intermediate cover 2, an air outlet 31 is formed in the bottom cover 3, the air blower 6 is fixedly arranged in the first accommodating space, the air inlet end of the air blower 6 communicates with the air inlet 21, the air outlet end of the air blower 6 communicates with the air outlet 31, the baffle plate 7 is fixedly arranged between the face cover 1 and the intermediate cover 2, and a second accommodating space 12 is formed among the face cover 1, the intermediate cover 2 and the baffle plate 7.

As shown in FIG. 4 specifically, it can also be understood in this way: the second accommodating space 12 is the left half part of the suction channel 11.

The air inlet 21 communicates with the interior of the second accommodating space 12, and a filter screen is fixedly arranged at the air inlet 21.

When the air blower 6 works, air in the second accommodating space 12 is sucked in the air blower 6 through the air inlet 21 and then sucked out of the air outlet 31, and the hairs or furs can be effectively blocked in the second accommodating space 12 by the filter screen.

The electric cutting assembly 4 includes a power supply 41, a circuit control board 42, a motor 43, a cutter head assembly 44, a slide switch 45 and a touch switch 46, the power supply 41, the motor 43, the air bower 6, the slide switch 45 and the touch switch 46 are electrically connected with the circuit control board 42, the motor 43 drives the cutter head assembly 44 to work, and the cutter head assembly 44 is located at the air inlet end 111 of the suction channel 11.

When the slide switch 45 is operated, the slide switch 45 sends a signal to the circuit control board 42, and the circuit control board 42 controls the motor 43 to work; and when the touch switch 46 is operated, the touch switch 46 sends a signal to the circuit control board 42, and the circuit control board 42 controls the air blower 6 to work.

Working principle: during working, when the touch switch 46 is operated, the touch switch 46 sends a signal to the circuit control board 42, the circuit control board 42 controls the air blower 6 to work, and the air blower 6 sucks air in the second accommodating space 12 from the air inlet 21 and then sucks the air out of the air outlet 31, so a negative pressure is formed in the suction channel 11; when the slide switch 45 is operated, the slide switch 45 sends a signal to the circuit control board 42, the circuit control board 42 controls the motor 43 to work, the motor 43 drives the cutter head assembly 44 to work; and after human hairs or animal furs are cut, the clipped hair or furs are directly sucked in the second accommodating space 12, and the hairs or furs can be effectively blocked in the second accommodating space 12 by the filter screen.

While the invention has been described in terms of preferred embodiments, those skilled in the art will recognize that the invention can be practiced with modifications within the spirit and scope of the appended claims.

What is claimed is:

1. An electric clipper, comprising:

a face cover;

a bottom cover wherein the face cover and the bottom cover are buckled on two sides of an intermediate cover respectively;

a first accommodating space formed between the intermediate cover and the bottom cover;

an electric cutting assembly fixedly arranged in the first accommodating space;

a suction channel formed between the face cover and the intermediate cover wherein an air inlet end of the suction channel is matched with the electric cutting assembly;

a baffle plate fixedly arranged between the face cover and the intermediate cover;

an air blower fixedly arranged in the first accommodating space wherein an air inlet is formed in the center of the intermediate cover, an air outlet is formed in the bottom cover, an air inlet end of the air blower communicates with the air inlet, and an air outlet end of the air blower communicates with the air outlet; and a second accommodating space formed among the face cover, the intermediate cover, and the baffle plate wherein the air inlet communicates with the interior of the second accommodating space.

2. The electric clipper of claim 1, wherein the electric cutting assembly comprises a power supply, a circuit control board, a motor, and a cutter head assembly wherein the power supply, the motor, and the air blower are all electrically connected to the circuit control board, the motor drives the cutter head assembly to work, and the cutter head assembly is located at the air inlet end of the suction channel.

3. The electric clipper of claim 2, wherein the electric cutting assembly further comprises a slide switch electrically connected to the circuit control board, and a touch switch electrically connected to the circuit control board.

* * * * *